March 10, 1953 T. W. THOMPSON 2,630,746
TRACTOR MOUNTED VINEYARD CULTIVATOR
Filed Feb. 4, 1947 2 SHEETS—SHEET 1

INVENTOR.
Theodore W. Thompson
BY
Florian G. Miller
Atty.

March 10, 1953 T. W. THOMPSON 2,630,746
TRACTOR MOUNTED VINEYARD CULTIVATOR
Filed Feb. 4, 1947 2 SHEETS—SHEET 2

INVENTOR.
Theodore W. Thompson
BY
Florian G. Miller,
Atty.

Patented Mar. 10, 1953

2,630,746

UNITED STATES PATENT OFFICE 2,630,746

TRACTOR MOUNTED VINEYARD CULTIVATOR

Theodore W. Thompson, North East, Pa.

Application February 4, 1947, Serial No. 726,285

3 Claims. (Cl. 97—137)

This invention relates generally to cultivators and more particularly to a novel cultivator attachment for a tractor especially for use between spaced aligned plants such as grape vines.

All devices of this character, made in accordance with the teachings of the prior art, and with which I am familiar, have been quite complicated in construction and have been especially designed for use between spaced aligned grape vines or the like, but they have found little use because they do not cut in and out in due time, with the result that many vines, plants and the like are pulled out by the roots or damaged. The result is that grape vineyards are still hoed with a horse drawn and hand hoe which is pulled into and out of the rows manually and which is very time consuming and laborious. Furthermore, no means has heretofore been provided to cultivate between the rows while also cultivating the area between the aligned vines, plants, or the like.

It is, accordingly, an object of my invention to provide a novel attachment for a tractor for cultivating between spaced aligned plates, vines or the like which is simple in construction, easy to operate, simple to attach to a tractor, economical in cost, and economical in manufacture.

Another object of my invention is to provide a novel hoe for hoeing grapes or the like which is fast acting and easily controlled.

Another object of my invention is to provide novel means for lifting a cultivating hoe from the ground.

Another object of my invention is to provide novel power means for operating a grape hoe between spaced aligned grape vines or plants.

Another object of my invention is to provide a cultivating hoe for a tractor attachment which is rotatably adjustable as well as angularly adjustable.

Another object of my invention is to provide novel shear means for a cultivating hoe attachment.

Other objects of my invention will become evident from the following detailed description, taken in conjunction with the accompanying drawings, in which:

Fig. 4 is a plan view of a modified form of tractor attachment for cultivating grapes or the like;

Fig. 5 is a top plan view of the hoe attaching bracket;

Figure 1:
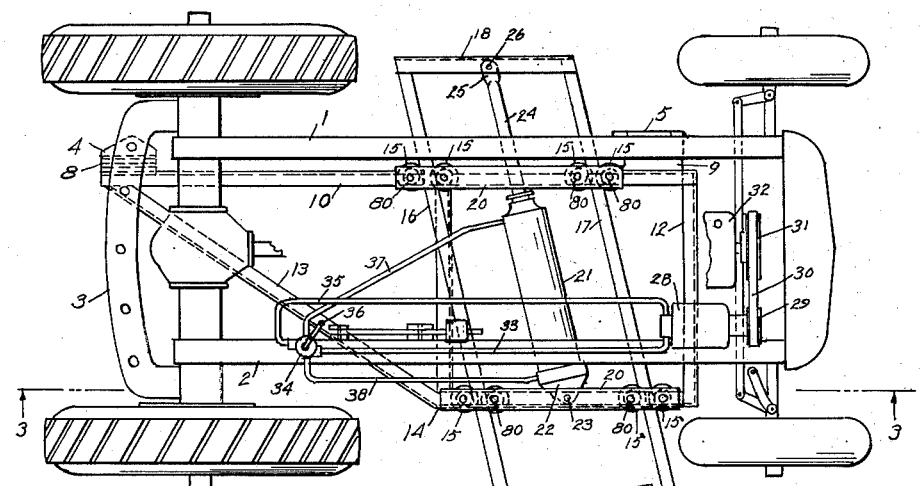
Fig. 1 is a plan view of my novel cultivating attachment assembled on a conventional tractor.
Figure 2:
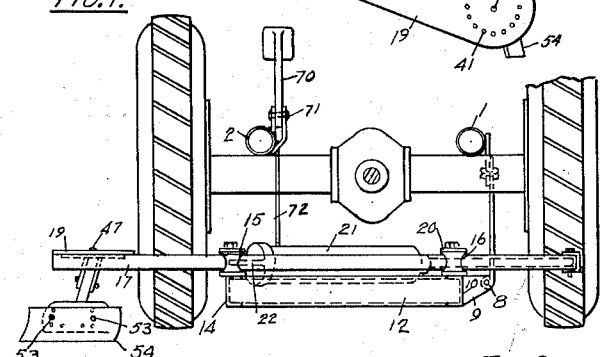
Fig. 2 is an end elevational view of my novel cultivating attachment assembled on a conventional tractor.
Figure 3:
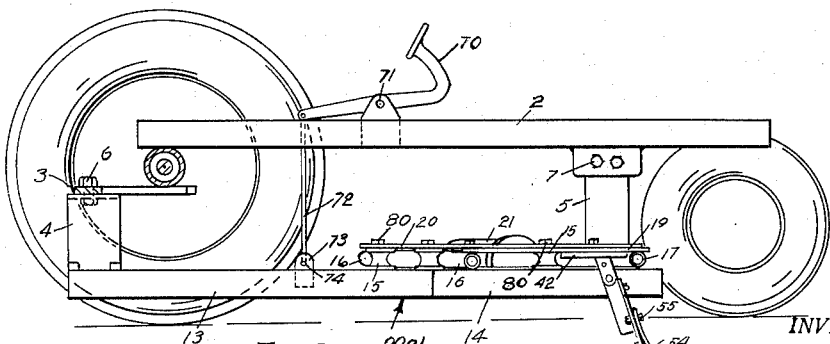
Fig. 3 is a view taken on the line 3—3 of Fig. 1.

Referring now to the drawings, Figs. 1, 2 and 3 show my novel cultivating attachment assembled on a conventional tractor having side frame members 1 and 2 and a rear draw bar member 3. Brackets 4 and 5 are attached to the draw bar member 3 and the side frame member 1 by suitable bolt and nut assemblies 6 and 7. The lower end of the brackets 4 and 5 has cylindrical hinge portions 8 for connection to the complementary hinged portions 9 on side frame member 10 of the underframe 90a of my novel cultivating attachment. The side frame member 10 has connected thereto a cross frame member 12, a diagonally extending frame member 13, and a parallel frame member 14 connected to the ends of the side frame members 12 and 13. Vertically extending rollers 15 having arcuate shaped grooved peripheral portions are mounted on vertical shafts 80 on the side frame members 14 and 10 in opposed relationship and receive reciprocable tubular frame members 16 and 17 of a transversely movable frame comprising tubular members 16 and 17, end member 18, and hoe attaching plate 19. Cover straps 20 connect the upper ends of the shafts 80.

A hydraulic cylinder 21 has a bracket 22 attached to frame member 14 by a suitable screw bolt 23 and a plunger rod 24 extending into the cylinder 21 and having a conventional piston (not shown) thereon, has a bracket 25 for connection to cross member 18 by a suitable screw bolt 26. Fluid under pressure is provided for the hydraulic cylinder 21 by means of a hydraulic pump 28 having a pulley 29 engaging a belt 30 which in turn engages a pulley 31 on the crank shaft of the motor 32 operating the tractor. The fluid is passed from the pump 28 and returned thereto by means of hydraulic lines 33, three-way valve 34 and line 35, and fluid passes alternately to opposite ends of the cylinder 21 when the valve handle 36 is rotated, through fluid lines 37 and 38 connecting opposite ends of the fluid cylinder 21.

Figures 6, 7, 8:
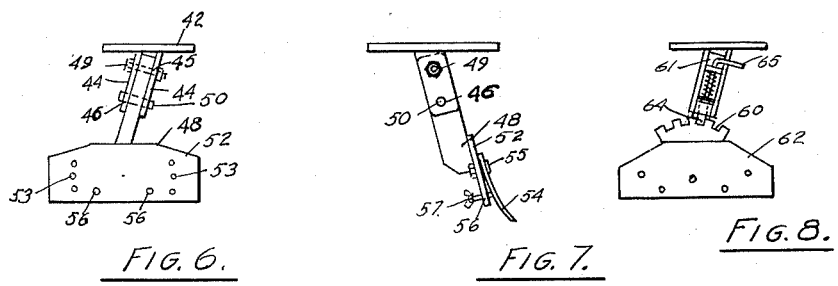
Fig. 6 is a side elevational view of the hoe attaching bracket and back plate for attaching a hoe.
Fig. 7 is a side elevational view of the bracket and back plate shown in Fig. 6 with a hoe attached.
Fig. 8 is a side elevational view of a modified form of hoe attaching bracket and back plate.

The attaching plate 19 has a center aperture 40 and a series of spaced apertures 41 forming a semi-circle to receive an attaching bracket plate 42 having spaced apertures 43 and depending parallel spaced brackets 44 with apertures 45 and shear pin apertures 46. In attaching the hoe attachment shown in Fig. 6 to the attaching plate 19, one aperture 43 in the attaching plate 42 is first aligned with the center aperture 40 and a predetermined one of the apertures 41 is aligned with the other aperture 43. The particular one of the holes 41 which is selected to be aligned with the second mentioned aperture 43 is determined by the desired angular setting of the hoe 54 during operation of the cultivator. A centrally flanged apertured connecting member 48 is attached to the depending brackets 44 by a bolt and nut assembly 49 and by a shear pin 50 of wood or the like. A support plate 52 on the connecting member 48 has apertures 53 disposed on opposite sides thereof in arcuate form for alignment with apertures 53 in the hoe 54 so that the hoe 54 may be secured by screw bolts 55 in several different angular positions laterally thereof. Threaded apertures 56 in the support plate 52 engage threaded members 57 wherein the ends of threaded members 57 engage the back bottom side of the hoe 54 to move it to any predetermined angular position in its direction of travel.

Figures 4, 5:
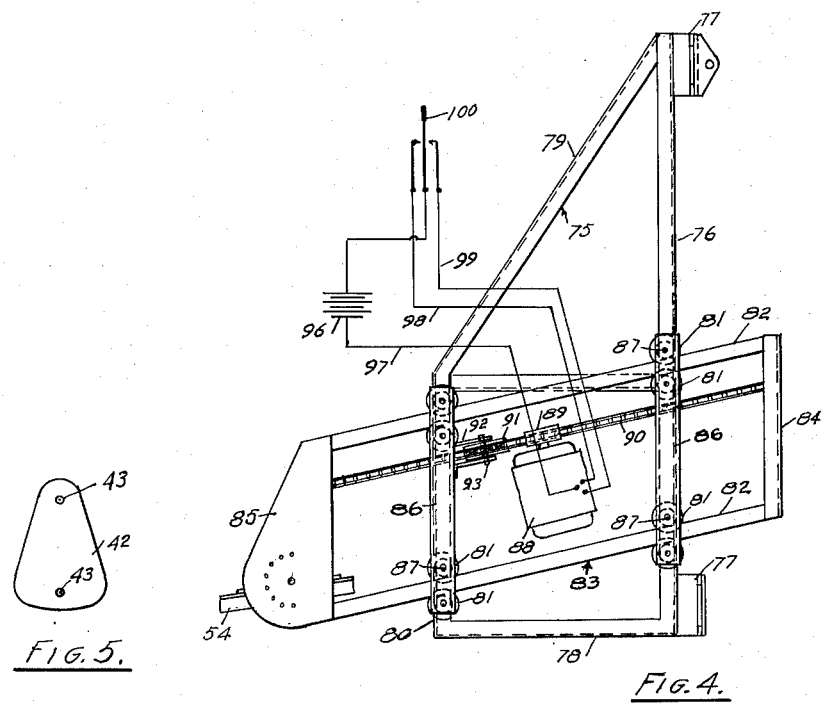

A modified form of construction for the hoe and adjustable means for laterally angularly adjusting the hoe is shown in Fig. 4 wherein a toothed sector 60 is disposed on a support plate 62 centrally pivoted on a supporting bracket 61. A spring catch member 64 engages the toothed sector 60. A handle 65 is provided to disengage the spring catch member 64 to permit rotation of the supporting plate 62, thereby causing it to assume different angular relationships laterally.

A foot lever 70 is pivoted on bracket 71 and is pivotally connected to a connecting link 72 attached to a bracket 73 on the outer side of the underframe 90a by a suitable bolt and nut assembly 74. The depth of cut of the hoe 54 may be adjusted vertically by varying the length of the connecting bracket 48, by varying the length of the connecting link 72, or by any other suitable means.

In operation, I pivotably mount my novel cultivating attachment on a tractor as shown in Figs. 1, 2 and 3 with the side frame member 10 of the underframe being pivotably mounted on the brackets 4 and 5. The hoe 54 is then properly adjusted rotatively and angularly for the proper depth and angle of cut. Upon operation of the tractor motor 32, the hydraulic pump 28 will provide fluid under pressure to the hydraulic lines 33, 35, 37 and 38 and valve 34 so that when the handle 36 of the valve 34 is turned in one direction, fluid will pass from the hydraulic motor 28 to the hydraulic line 33, valve 34, hydraulic line 37, to one end of the cylinder 21, thereby forcing the plunger 24 and attached frame member 18 of the transverse frame 18 outwardly transversely of the tractor and causing the hoe 54 to move between aligned grape or other plants to cultivate the ground therebetween. When the handle 36 is moved in the opposite direction, fluid passes out of the cylinder 21 back through hydraulic line 37, valve 34, through return line 33 and to the pump 28. At the same time, fluid under pressure passes from the pump 28 through the hydraulic line 33, through valve 34, through hydraulic line 38 to the opposite end of the cylinder 21, thereby forcing the piston in the cylinder 21 in an opposite direction and forcing the plunger 24 and attached frame 18 in an opposite direction to cause the attaching plate 19 and hoe 54 attached thereto to move toward the tractor and out of alignment with the grape or other plants in the row being cultivated. When it is desired to move the hoe 54 from the ground, the foot lever 70 pivoted on bracket 71 is pushed forwardly, thereby lifting the outer portion of the underframe upwardly by means of connecting link 72.

In Fig. 4 I show the same pivoted frame and movable cross frame as shown in Figs. 1, 2 and 3 and the only difference is that the movable cross frame is actuated by electrical means. In Fig. 4 I show an underframe 75 having a longitudinally extending frame member 76 having hinges 77 for attachment to brackets 4 and 5 on the tractor shown in Figs. 1, 2 and 3. The underframe 75 comprises side frame member 76, cross frame member 78, diagonally disposed frame member 79 and side frame member 80 connecting frame members 79 and 78. Rollers 81 having grooved arcuate shaped peripheral portions complementary to each other, receive tubular frame members 82 of a movable transverse frame 83 having an end frame member 84 and an outer attaching plate 85. The attaching plate 85 is identical with the attaching plate 19 shown in Figs. 1 and 3 and is adapted to have the hoe 54 and all other attaching brackets detachably connected thereto as heretofore described. Cover straps 86 are disposed over the rollers 81 and connect the shafts 87 supporting the rollers 81. An electric motor 88 of the reversible type has a sprocket wheel 89 with the under side thereof in engagement with a sprocket chain 90 which has one end thereof attached to the cross frame member 84 of the frame 83 and the other end thereof attached to the outer attaching plate 85 on the opposite end of the frame 83. A pulley or sprocket wheel 91 engaging the sprocket chain 90 is mounted on brackets 92 by pin 93, the brackets 92 being attached by welding or any other suitable means to side frame member 80 of frame 75. The motor 88 is energized by means of a battery 96 through wires 97, 98, and 99 and double pole switch 100. It will thus be evident that moving the switch 100 in one or another direction, the motor 88 will be energized, thereby causing the frame 83 to move in an outward or an inward direction for cultivating between grape or other plants aligned in a row.

It will thus be evident from the foregoing description that I have provided a novel cultivating attachment for a tractor which is very fast and positive in action so that a hoe is passed outwardly from and returned toward the tractor quickly, thereby enabling the hoe to be placed between spaced aligned grape or other plants and also permitting the hoe to move in very close to the plant to cultivate the ground therearound. It has been found that my novel hoe is capable of cultivating much closer to the plants than a horse drawn cultivator or grape hoe and few plants are damaged with the use of my novel cultivating device. Although I have shown the transversely movable frames to which the hoe is attached movable outwardly angularly with respect to the underframe, it will be evident that other angular relationships may be provided.

Various changes may be made in the specific embodiment of my invention without departing from the spirit thereof, or from the scope of the appended claims.

What I claim is:

1. A quickly attachable and detachable cultivating attachment for connection to a tractor having longitudinal side frame members and a draw bar comprising an under frame adapted to be disposed on the underside of said tractor, pivot members pivotally and detachably connecting one side of said under frame to one of said side frame members and to said draw bar, opposed pairs of rollers mounted on opposite sides of said under frame having opposed, arcuate shaped portions, parallel, transversely movable tubular members received in the arcuate shaped portions of said opposed rollers for supporting same in transverse movement therein, cross frame members securing said tubular members in parallel relationship, a hydraulic cylinder having one end attached to one side of said under frame, a plunger operable by a piston in said cylinder attached to one of said cross frame members, fluid lines leading to opposite ends of said cylinder, a valve adapted to admit fluid under pressure alternately to opposite ends of said cylinder to reciprocate said plunger, a lever attached to said tractor frame for moving the free side of said under frame vertically, and a means on said cross frame member opposite to the one to which said plunger is attached to secure an earth working tool.

2. A cultivating attachment for a tractor as set forth in claim 1 wherein said parallel tubular members are disposed angularly on said tiltable frame wherein said earth working tool attached thereto moves angularly forwardly from the side of said tractor.

3. A quickly attachable and detachable cultivating attachment for connection to a tractor having longitudinal side frame members and a draw bar comprising an under frame adapted to be disposed on the underside of said tractor, pivot members pivotally and detachably connecting one side of said under frame to one of said side frame members and to said draw bar, pairs of opposed vertically extending shafts carried by said frame spaced longitudinally and laterally of said under frame defining a parallelogram, rollers disposed on said shafts having opposed, arcuate shaped portions, a transversely movable member having tubular side frames supported by and longiudinally movable between the arcuate shaped portions of said rollers and cross frame members on the ends of said tubular members, a hydraulic cylinder disposed intermediate said tubular members in balanced relationship having one end connected to the free side of said tiltable under frame, a piston movable in said cylinder, a plunger attached to said piston and to a cross frame member on said transversely movable member for reciprocating said transversely movable member, means for selectively admitting fluid under pressure alternately to opposite ends of said cylinder to move said transverse member to and fro, a lever attached to said tractor frame for tilting said tiltable frame and said transversely movable frame carried thereby, and means on a cross frame member on said transversely movable member remote from said pivot members secured to one side of said under frame for attaching an earth working tool.

THEODORE W. THOMPSON.

REFERENCES CITED

The following references are of record in the file of this patent:

UNITED STATES PATENTS

| Number | Name | Date |
|---|---|---|
| 191,451 | Lynch et al. | May 29, 1877 |
| 695,178 | Solomon | Mar. 11, 1902 |
| 890,843 | Cole | June 16, 1908 |
| 1,570,415 | Sumbulian | Jan. 19, 1926 |
| 1,593,258 | Haworth | July 20, 1926 |
| 1,728,318 | Wilson | Sept. 17, 1929 |
| 2,188,029 | Bateman | Jan. 23, 1940 |
| 2,206,283 | Jacobs et al. | July 2, 1940 |
| 2,218,512 | Ball | Oct. 22, 1940 |
| 2,419,331 | Best | Apr. 22, 1947 |
| 2,442,198 | Dawley | May 25, 1948 |
| 2,521,549 | Smith | Sept. 5, 1950 |